United States Patent
Austin et al.

[19]

[11] Patent Number: 5,937,499
[45] Date of Patent: *Aug. 17, 1999

[54] MACHINING BRAKE DISC WITHOUT MOMENT LOAD ON BEARING

[75] Inventors: Vince Austin, Rochester Hills, Mich.; Glenn Kochan, Newport News, Va.

[73] Assignee: Varga Brakes, Inc., Livonia, Mich.

[*] Notice: This patent is subject to a terminal disclaimer.

[21] Appl. No.: 08/994,904

[22] Filed: Dec. 19, 1997

[51] Int. Cl.$^6$ ........................................................ B24B 1/00
[52] U.S. Cl. ................................ 29/434; 82/1.11; 82/112; 188/18 R; 188/218 XL; 451/63; 451/902; 29/557
[58] Field of Search ........................... 188/218 XL, 18 R; 451/63, 290, 902; 29/434, 898.062, 898.07, 898.09, 557; 82/1.11, 112

[56] References Cited

U.S. PATENT DOCUMENTS

| | | | |
|---|---|---|---|
| 3,540,165 | 11/1970 | Lanham | 51/281 |
| 3,555,940 | 1/1971 | Cooper | 82/117 |
| 4,825,596 | 5/1989 | Kinner | 51/281 |
| 5,159,754 | 11/1992 | Vancsik | 29/898.07 |
| 5,430,926 | 7/1995 | Hartford . | |
| 5,596,798 | 1/1997 | Hofmann et al. | 29/724 |
| 5,653,153 | 8/1997 | Greenwald | 82/112 |
| 5,842,388 | 12/1998 | Visser et al. | 82/112 |

OTHER PUBLICATIONS

U.S. application No. 08/807,079, filed Feb. 27, 1997, titled "Method for Fabricating Brake Disc".

U.S. application No. 08/859,696, filed May 31, 1997, titled "Improved Method for Fabricating Brake Disc".

*Primary Examiner*—Joseph M. Gorski
*Assistant Examiner*—John Preta
*Attorney, Agent, or Firm*—Howard & Howard

[57] ABSTRACT

A method for fabricating a brake disc assembly comprising the steps of inserting a fixture post (72) through a bore (22) in the hub (14) and disposing a nose-shaped pressure plate (74) into a pocket (73) within the circumference of the inner hub (14) with a washer/nut (78) over the pressure plate (74) to place the post (72) in tension against the bearing assembly to maintain a pre-load on the bearing assembly. The outer race (32) of the bearing assembly is clamped with the gage surface (54) drawn against a gage (84) to properly orient the outer race (32) about a fixed axis (A). A spoke or disc (77) extends radially from the pressure plate (74) and is disposed in axially spaced relationship to the base (26) of the brake disc to be in circumferential driving relationship with the studs (64). Thereafter, the inner hub (14) is engaged through the washer/nut (78) by a rotating member (86) which rotates about a floating axis (B) in a plane perpendicular to the rotation axis (B) as the rotating member (86) is urged against the washer/nut (78) to compress a resilient pad (68) between the rotating member (86) and the washer/nut (78). The braking surfaces (30) of the rotor (28) are machined (92) while the rotating member (86) rotates the hub (14) and brake disc relative to the outer race (32), which is held in a fixed position relative to the machining tools (92). By keeping the axial forces isolated from the hub flange (20), there are no moments on the bearing assembly.

9 Claims, 5 Drawing Sheets

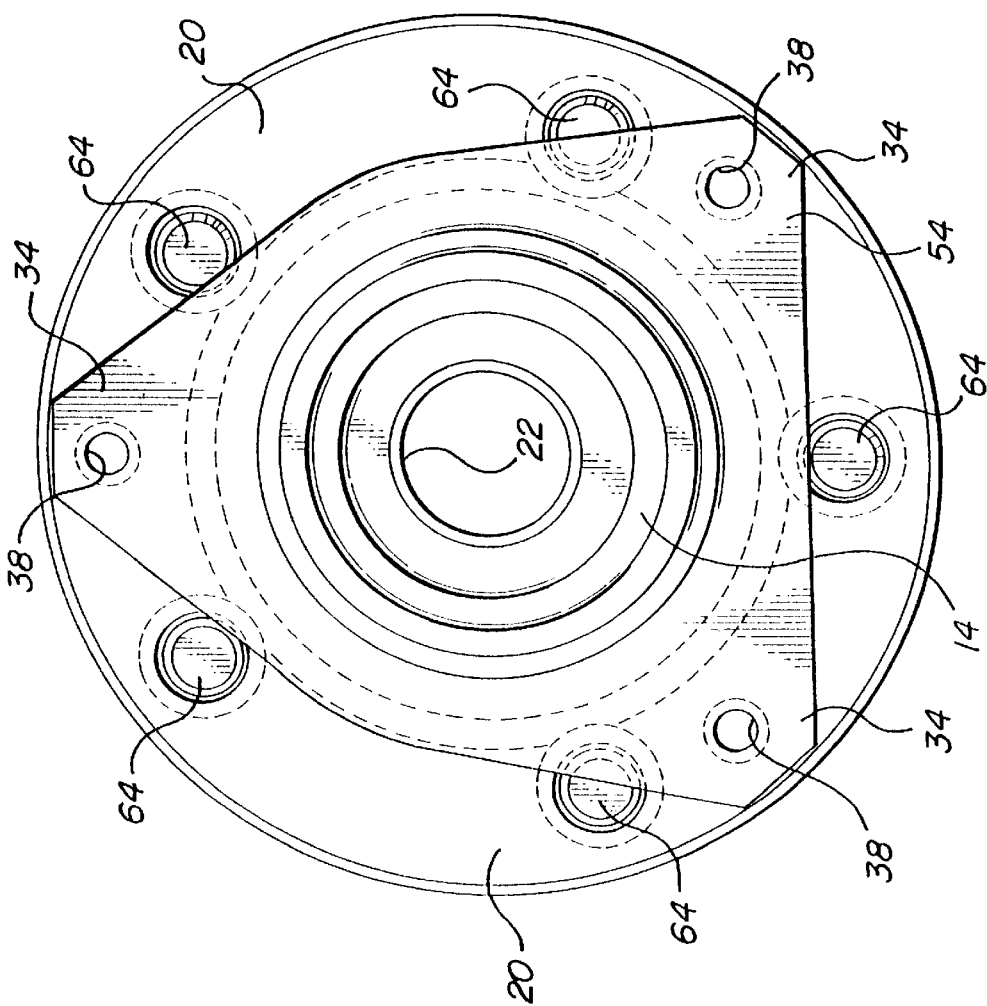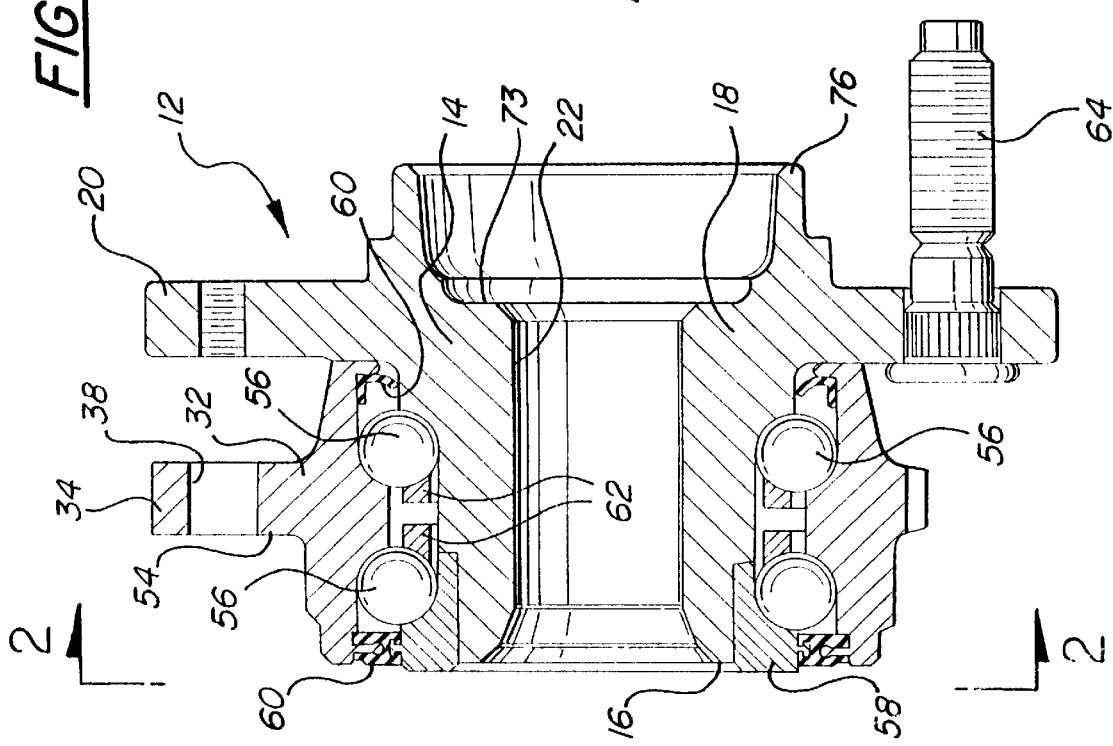

MACHINING BRAKE DISC WITHOUT MOMENT LOAD ON BEARING

BACKGROUND OF THE INVENTION

1. Field of the Invention

The subject invention relates to the disc brakes and, more specifically, to a method of fabricating the braking surfaces on the brake disc.

2. Description of the Prior Art

With the advent of front wheel drive vehicles and disc brakes, the assembly which is driven by the drive shaft comprises a hub presenting a disc flange supporting a rotor having opposed braking surfaces and with a bearing assembly surrounding the hub with an outer race presenting a support flange for attachment to a king pin of a vehicle. When fully assembled on the vehicle, the braking surfaces of the disc rotor are disposed adjacent the brake pads of the brake disc assembly and separated from engaging the braking surfaces by a brake running clearance when the brake piston is not actuated. When the brake piston is actuated, the brake pads take up the clearance and engage the braking surfaces.

In order to provide this uniform running clearance, and to avoid adverse wear of the disc when the brakes are not applied, the disc rotor must be manufactured to close tolerances with the braking surfaces oriented radially or perpendicularly to the axis of rotation of the rotor when installed. A method of machining to close tolerances on a disc which is mounted through a bearing on a fixed stub shaft is disclosed in U.S. Pat. No. 5,430,926 issued Jul. 11, 1995 to D. J. Hartford. Normally, however, in a front drive or driven wheel, a bearing assembly is disposed about the hub, rather than in the hub as in the aforementioned patent, and after the braking surfaces have been machined. As the bearing assembly is mounted to the vehicle, the bearing assembly is loaded to finalize the relationship or orientation between the braking surfaces and the axis of rotation and can result in misalignment of the braking surfaces. A method of machining a brake disc assembly which moves the art forward is disclosed and claimed in co-pending application Ser. No. 08/807,079 filed Feb. 27, 1997 in the names of Raymond C. Rapisardi and Vince J. Austin, and in co-pending application Ser. No. 08/859,696 filed May, 21, 1997 in the names of Glenn Kochan and Vince J. Austin. However, perfections are yet to be made in this new method.

SUMMARY OF THE INVENTION AND ADVANTAGES

The invention includes a method for fabricating a brake disc assembly including an inner hub extending between a drive end and a wheel end and a disc flange extending radially about the circumference of the inner hub at the wheel end with the inner hub having a bore extending between the ends for receiving a drive shaft, a brake disc having a base attached to the disc flange about the circumference of the inner hub and a rotor extending radially from the base and presenting parallel braking surfaces, a bearing assembly surrounding the hub between the drive end and the disc flange for supporting the hub with an outer race presenting a support flange for attachment to a support structure. The method comprises the steps of: clamping the outer race of the bearing assembly in a fixed orientation about a fixed axis; rotating the brake disc and the hub relative to the outer race about a rotation axis by frictionally engaging the hub with a rotating member in a plane perpendicular to the rotation axis to allow for relative radial movement between the base of the brake disc and the rotating member to thereby allow for relative radial movement between the brake disc and the outer race; and machining the braking surfaces of the rotor while rotating the hub and brake disc relative to the outer race. The method is characterized by frictionally engaging the inner hub with the rotating member solely within the circumference of the inner hub at the wheel end to apply axial forces resulting from the frictional engagement through the inner hub without applying axial forces to the disc flange and the base of the brake disc.

Accordingly, axial forces are applied to the hub without applying a moment to the hub flange which would be different from the forces applied when the bearing assembly is in the installed or mounted condition, yet machine the braking surfaces of the brake disc so as to reduce lateral runout and running clearances.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a cross sectional view of the hub and bearing assembly processed in accordance with the subject invention;

FIG. 2 is a view taken substantially along line 2—2 of FIG. 1;

DETAILED DESCRIPTION OF THE PREFERRED EMBODIMENT

Figure 5:
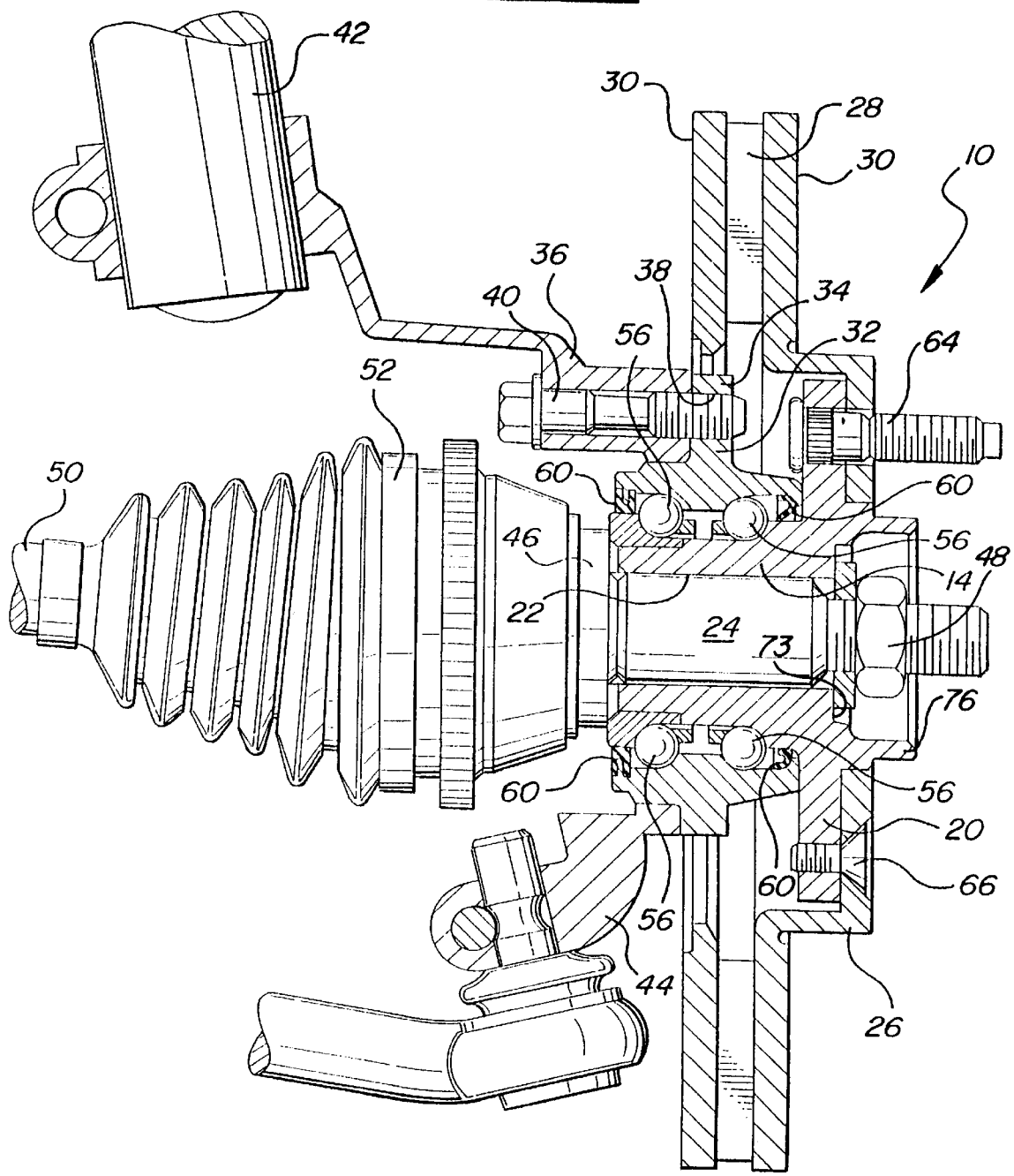
FIG. 5 is a cross sectional view of the completed assembly installed in a vehicle.
Figure 7:
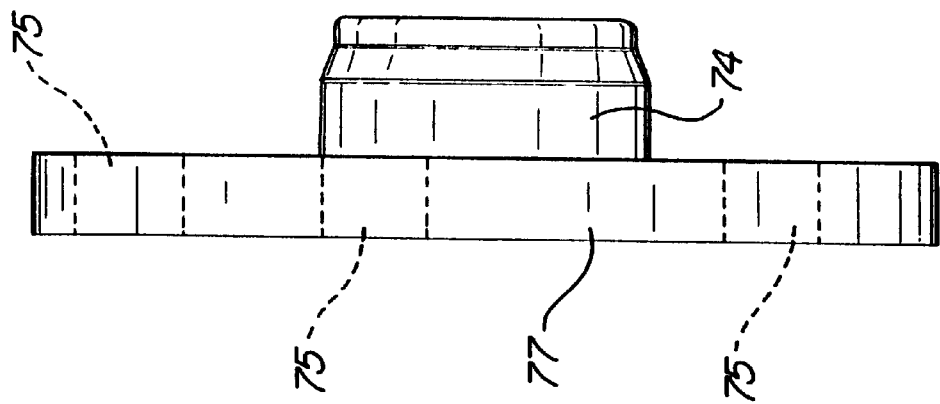
FIG. 7 is a side view of the pressure plate of FIG. 6.
Figure 6:
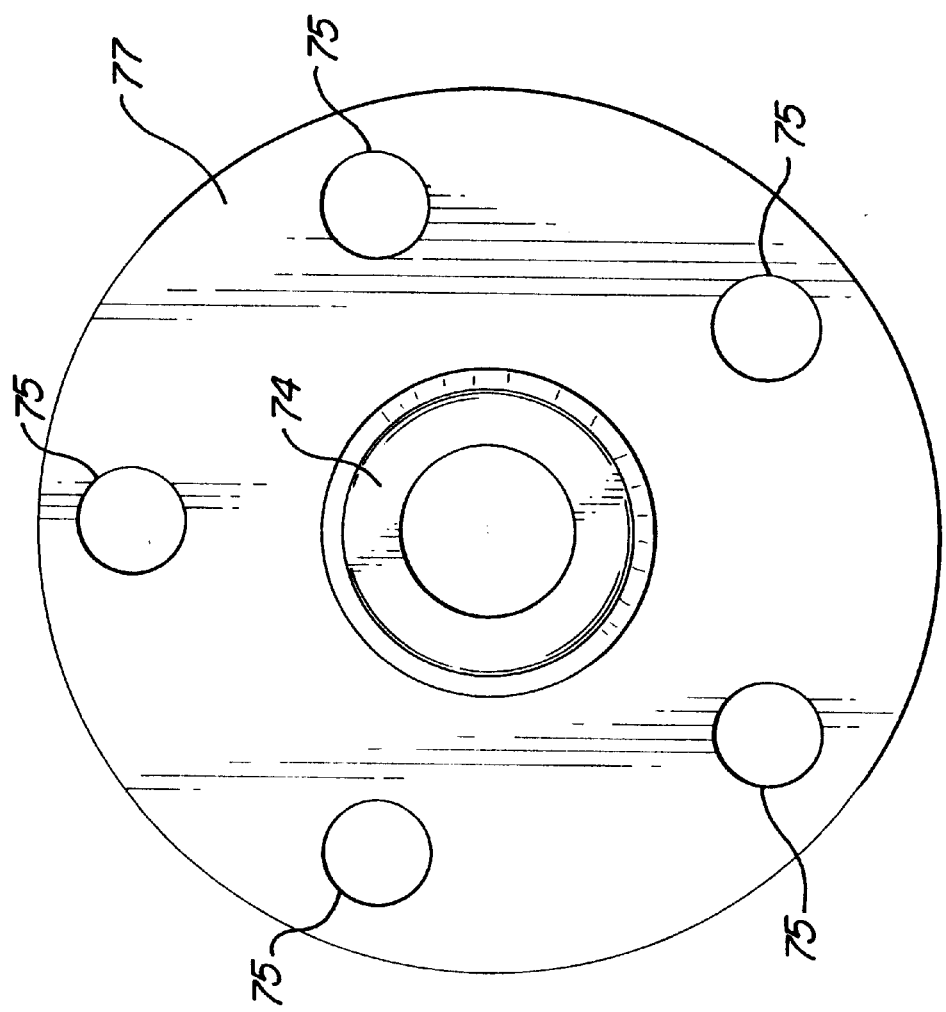
FIG. 6 is an elevational view of the pressure plate.

Referring to the Figures, wherein like numerals indicate like or corresponding parts throughout the several views, a hub and brake disc assembly manufactured in accordance with the subject invention is generally shown at 10. The assembly 10 includes a hub and bearing subassembly as generally shown at 12 in FIG. 1. The subassembly 12 comprises an inner hub 14 extending between a drive end 16 and a wheel end 18. A disc flange 20 extends radially about the circumference of the inner hub 14 at the wheel end 18. The inner hub 14 has a bore 22 extending between the ends 16 and 18 for receiving a drive shaft 24, as shown in FIG. 5. The subassembly 12 also includes a brake disc having a base 26 attached to the disc flange 20 about the circumference of the inner hub 14 and a rotor 28 extending radially from the inner hub 14 and presenting parallel braking surfaces 30. A bearing assembly surrounds the inner hub 14 between the drive end 16 and the disc flange 20 for supporting the inner hub 14. To support the inner hub 14, the bearing assembly includes an outer race 32 presenting a support flange 34 for attachment to a support structure 36. The support flange 34 is generally triangular in peripheral configuration as best shown in FIG. 2. The support flange 34 includes holes 38 at the apexes for receiving bolts 40 which, in turn, attach to the knuckle defining the support structure 36. The knuckle 36 is rotatably supported by a strut 42. A ball joint 44 connects the knuckle to the car structure. The drive shaft 24 has a head 46 in engagement with the bearing assembly and a nut/washer 48 which places the shaft 24 in tension to load the bearing assembly and to rotate the inner hub 14, which drives a wheel. The driving force is delivered through a drive axle 50 and a universal coupling, i.e., a constant velocity joint, 52, all of which is well known in the art.

The method for fabricating a brake disc assembly in accordance with the subject invention comprises various steps which may be performed in numerous different sequences.

The first step is the machining of a radially extending gage surface 54 on the support flange 34 of the outer race 32. This is followed by disposing roller elements 56 and the outer race 32 of the bearing assembly around the inner hub 14 with the gage surface 54 facing the drive end 16 of the inner hub 14. A race lock member 58 is secured to the inner hub 14 by a press fit to retain the bearing assembly on the inner hub 14 under a predetermined pre-load. At the same time, seals 60 are positioned between each end of the bearing assembly and the inner hub 34 and race lock member 58. Separators or cages 62 are also disposed between the roller elements 56.

A plurality of wheel studs 64 are secured to the disc flange 20 to extend axially therefrom toward the wheel end 18 of the inner hub 14, the studs 64 being press fitted in holes in the disc flange 20. The studs 64 are threaded and are employed to attach a wheel to the assembly, as is well known in the art.

The next step is the attaching of the base 26 of the brake disc to the disc flange 20 with the wheel studs 64 extending through the base 26 of the brake disc. The base 26 of the brake disc is attached to the flange 20 of the inner hub 14 by screws 66.

The head 70 of a fixture post 72 has an annular shoulder 69 for engaging the race lock member 58. The fixture post 72 is supported vertically for receiving the inner hub 14. The inner hub 14 is placed on the post 72 with the head 70 of a fixture post 72 in engagement with the race lock member 58 as the post 72 is inserted through the bore 22 to extend from the wheel end 18 of the inner hub 14. The post 72 snugly engages the interior of the bore 22.

While in the vertical position, a pressure plate 74 is disposed about the wheel end 18 and in engagement with the inner hub 14. More specifically, a pocket 73 is formed in the wheel end 18 of the inner hub 14 which is surrounded by a projection 76 extending from the wheel end 18. The pocket 73 is radially within the circumference of the inner hub 14 as defined by that circumference of the inner hub 14 upon which the roller elements 56 are in rolling engagement. The pressure plate 74 comprises a nose which is disposed radially within the pocket 73 and end engages the inner hub 14 within its outer circumference.

At least one spoke, a circular disc 77 as illustrated, extends radially from the pressure plate 74 and in axially spaced relationship to the base 26 of the brake disc and in circumferential driving relationship with the studs 64. It is important that the pressure plate exert no axial forces on the flange 20 to prevent a moment on the bearing assembly which would not exist when in the installed condition of FIG. 5. A plurality of bushings 75 are press fitted into the spoke 77 to surround, in spaced relationship, each of the studs 64. The bushings 75 are of brass or rubber, which is softer than the studs 64, to prevent damage to the threads of the studs 64.

A washer/nut 78 is disposed over the pressure plate 74 and in threaded engagement with the post 72 to place the post 72 in tension between the race lock member 58 and the pressure plate 74 to urge the nose of the pressure plate 74 into engagement with the pocket 73 of the inner hub 14 for simulating the pressure points exerted by a vehicle wheel axle 24. This maintains the pre-load on and retains the bearing assembly to the inner hub 14; this prevents the race lock member 58 from changing position to maintain the pre-loading the same as occurs when the assembly is mounted on the vehicle as shown in FIG. 5.

Figure 3:
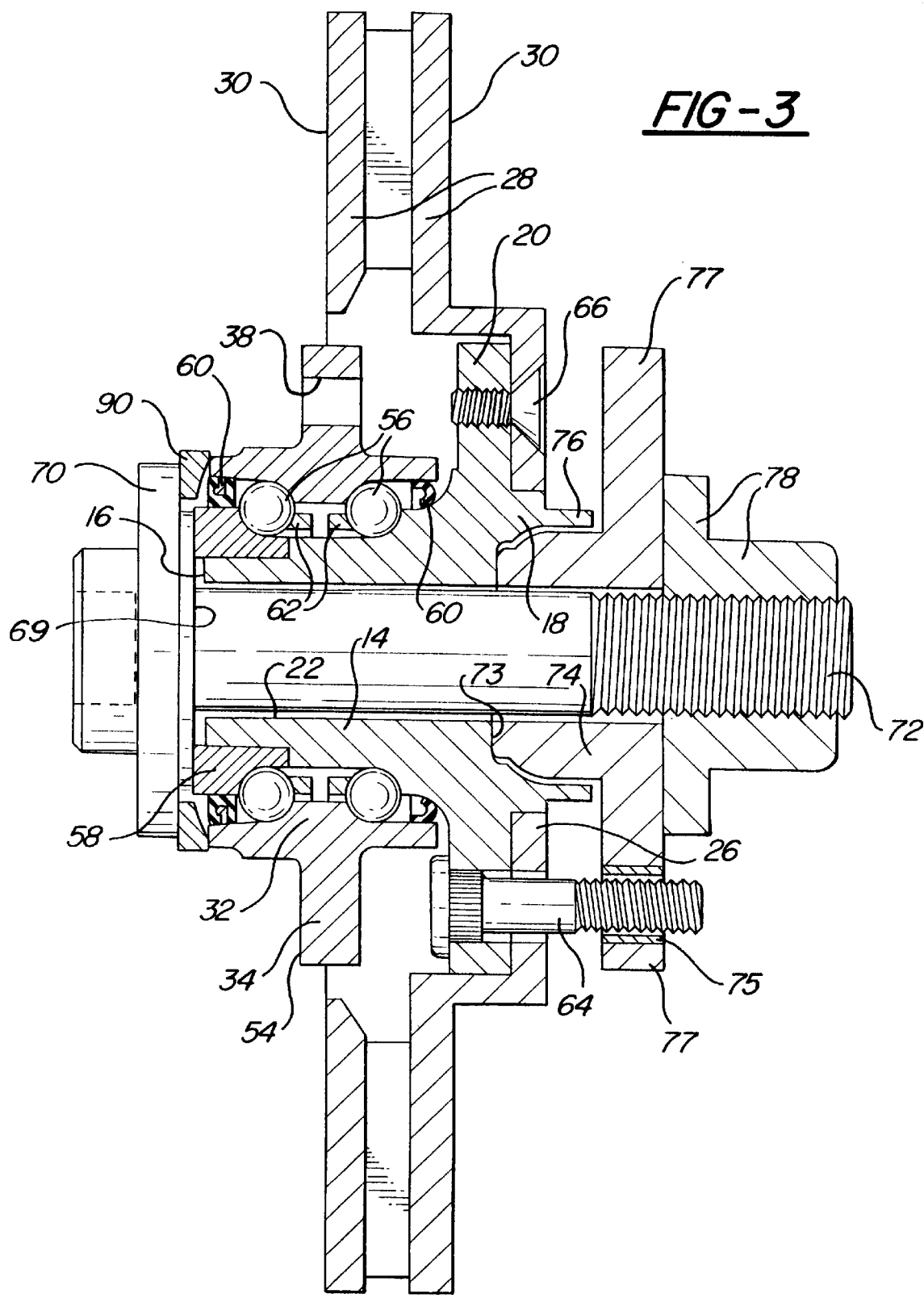
FIG. 3 is a cross sectional view of the brake disc assembly with the clamping fixture attached thereto.
Figure 4:
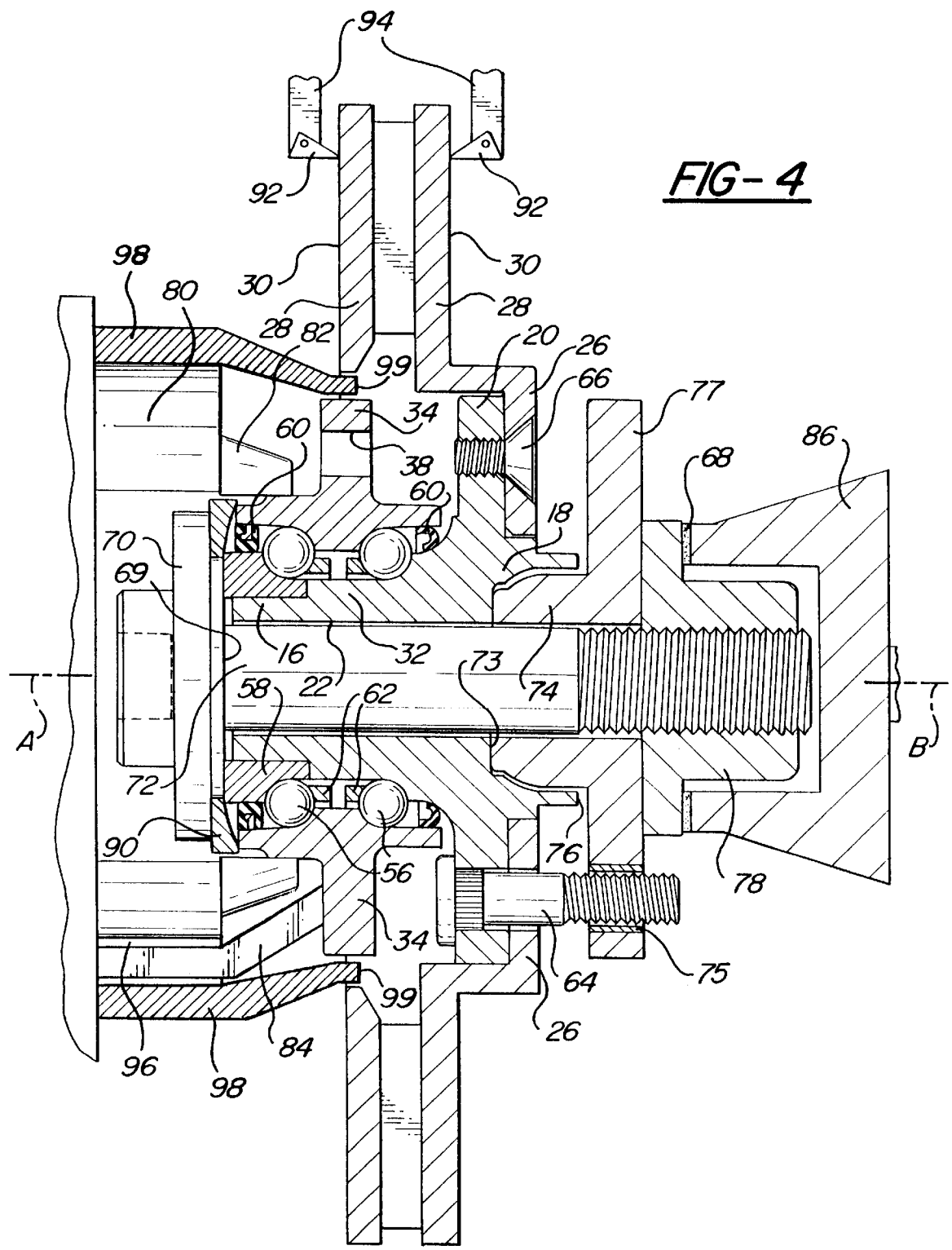
FIG. 4 is a cross sectional view of the assembly of FIG. 3 disposed in the machine for performing the machining of the disc braking surfaces.

This subassembly is then moved to a machining station, as shown in FIG. 4, and placed in position to be grasped by a cam chuck 80 mounted on a stationary machine. The cam chuck 80 has jaws 82 which clamp the outer race 32 of the bearing assembly and draws the gage surface 54 against a gage 84 to properly orient the outer race 32 about a fixed axis A. The gage 84 is shown as engaging only one area of the circumference of the gaging surface 54; however, the gage 84 engaging most of the circumference of the gaging surface 54 and includes air sensors to affirm that the gaging surface 54 is properly oriented and engaging the gage 84 in all quadrants.

Once the outer race 32 is clamped in a fixed position relative to the fixed axis A, the next step is engaging the washer portion of the nut 78 with a rotating member 86 to rotate the rotating member 86 about a floating axis B. More specifically, a resilient pad 68 is sandwiched between the washer portion of the nut 78 and the rotating member 86 in a plane perpendicular to the rotation axis B and urging the rotating member 86 against the washer portion of the nut 78 to compress the resilient pad 68 between the rotating member 86 and the washer portion of the nut 78. Accordingly, the rotation member 86 rotates about the axis B which is floating, i.e., not fixed, to allow some relative radial movement between the outer race 32 and the inner hub 14 or brake disc. The resilient pad 68 allows relative radial movement between the rotation member 86 and the washer portion of the nut 78 as the rotation member 86 is urged or forced axially into engagement with the resilient pad 68. The inner hub 14 is frictionally engaged by the rotating member 86 solely within the circumference of the inner hub 14 at the wheel end 18 to apply axial forces resulting from the frictional engagement through the inner hub 14 without applying axial forces to the disc flange 20 and the base 26 of the brake disc. This prevents axial forces from being applied to the disc flange 20 and the base 26 of the brake disc. Said another way, the method includes placing the nut 78 in threaded engagement with the fixture post 72 and tightening the nut 78 against the pressure plate 74 and engaging the washer portion of the nut 78 with the rotating member 86 through the pads 68.

The final step is the machining of the braking surfaces 30 of the rotor 28 while rotating the inner hub 14 and brake disc relative to the outer race 32. This machining is accomplished with cutting inserts 92 which are supported on shafts 94 on opposite sides 30 of the disc rotor 28.

In addition, an annular seal 90 is disposed between the head 70 of the fixture post 72 and the outer race 32 to prevent contaminants from entering the bearing assembly during the machining, i.e., to prevent metal removed by the machining from entering the bearing assembly.

Another feature is an annular plastic ring 98 supported annularly by the chuck 80 and extending to a taper 99 in the space between the flange 34 and the disc 30 to prevent chips from the machinery from entering the bearing assembly. The gage 84 extends through a hole 96 in the chuck 80.

Subsequently, the post 72 is removed and the assembly is installed onto the knuckle as shown in FIG. 5.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A method for fabricating a brake disc assembly including an inner hub (14) extending between a drive end (16) and a wheel end (18) and a disc flange (20) extending radially about the circumference of the inner hub (14) at the wheel end (18) with the inner hub (14) having a bore (22) extending between the ends for receiving a drive shaft, a brake disc having a base (26) attached to the disc flange (20) about the circumference of the inner hub (14) and a rotor (28) extending radially from the base (26) and presenting parallel braking surfaces (30), a bearing assembly surrounding the hub (14) between the drive end (16) and the disc flange (20) for supporting the hub (14) with an outer race (32) presenting a support flange (34) for attachment to a support structure (36), said method comprising the steps of:

clamping the outer race (32) of the bearing assembly in a fixed orientation about a fixed axis (A);

rotating the brake disc and the hub (14) relative to the outer race (32) about a rotation axis (B) by frictionally engaging the hub (14) with a rotating member (86) in a plane perpendicular to the rotation axis (B) to allow for relative radial movement between the base (26) of the brake disc and the rotating member (86) to thereby allow for relative radial movement between the brake disc and the outer race (32); and machining the braking surface (30) of the rotor (28) while rotating the hub (14) and brake disc relative to the outer race (32);

said method characterized by frictionally engaging the inner hub (14) with the rotating member (86) solely within the circumference of the inner hub (14) at the wheel end (18) to apply axial forces resulting from the frictional engagement through the inner hub (14) without applying axial forces to the disc flange (20) and the base (26) of the brake disc.

2. A method as set forth in claim 1 including disposing roller elements (56) and the outer race (32) of the bearing assembly around the inner hub (14); securing a race lock member (58) to the inner hub (14) to retain the bearing assembly on the inner hub (14); maintaining a pre-loading on the bearing assembly while machining the braking surfaces (30) by applying a force between the race lock member (58) and the circumference of the inner hub (14) at the wheel end (18) to urge the race lock member (58) onto the inner hub (14) within the circumference of the inner hub (14) to prevent axial forces from being applied to the disc flange (20) and the base (26) of the brake disc.

3. A method as set forth in claim 2 further defined as maintaining the preloading on the bearing assembly by inserting a fixture post (72) through the bore (22) and placing the post (72) in tension between the race lock member (58) and the wheel end (18) of the inner hub (14) within the circumference of the inner hub (14).

4. A method as set forth in claim 3 further defined by disposing a pressure plate (74) about the wheel end (18) and in engagement with the inner hub (14) within the circumference of the inner hub (14); and placing the post (72) in tension between the pressure plate (74) and the bearing lock member (58) to urge the pressure plate (74) against the inner hub (14) within the circumference of the inner hub (14).

5. A method as set forth in claim 4 further defined as securing a plurality of wheel studs (64) to the disc flange (20) to extend axially therefrom toward the wheel end (18) of the hub (14); disposing a spoke (90) extending radially from the pressure plate (74) in axially spaced relationship to the base (26) of the brake disc and in circumferential driving relationship with the studs (64).

6. A method as set forth in claim 5 further defined as disposing a resilient pad (68) disposed between the pressure plate (74) and the rotating member (86) for facilitating the relative radial movement between the base (26) of the brake disc and the rotating member (86).

7. A method as set forth in claim 5 including forming a pocket (73) in the wheel end (18) of the hub (14) and disposing the pressure plate (74) within the pocket (73).

8. A method as set forth in claim 3 including disposing a seal between the fixture post (72) and the outer race (32) to prevent contaminants from entering the bearing assembly during the machining.

9. A method as set forth in claim 4 including placing a nut (78) in threaded engagement with the fixture post (72) and tightened against the pressure plate (74) and engaging the nut (78) with the rotating member (86).

\* \* \* \* \*